US012591206B2

(12) United States Patent
Tajima et al.

(10) Patent No.: US 12,591,206 B2
(45) Date of Patent: Mar. 31, 2026

(54) TIMEPIECE CASE AND ELECTRONIC TIMEPIECE

(71) Applicant: CASIO COMPUTER CO., LTD., Tokyo (JP)

(72) Inventors: Chieko Tajima, Kodaira (JP); Hajime Iguchi, Fuchu (JP); Kazuma Kobayashi, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 278 days.

(21) Appl. No.: 18/548,068

(22) PCT Filed: Jan. 12, 2022

(86) PCT No.: PCT/JP2022/000622
§ 371 (c)(1),
(2) Date: Aug. 25, 2023

(87) PCT Pub. No.: WO2022/181082
PCT Pub. Date: Sep. 1, 2022

(65) Prior Publication Data

US 2024/0295856 A1 Sep. 5, 2024

(30) Foreign Application Priority Data

Feb. 26, 2021 (JP) ................................ 2021-029452

(51) Int. Cl.
*G04B 39/02* (2006.01)
*G04B 37/08* (2006.01)
*G04G 17/08* (2006.01)

(52) U.S. Cl.
CPC ............ *G04B 39/02* (2013.01); *G04B 37/08* (2013.01); *G04G 17/08* (2013.01)

(58) Field of Classification Search
CPC ...... G04B 39/02; G04B 37/08; G04B 39/025; G04B 37/084; G04G 17/08
See application file for complete search history.

(56) References Cited

U.S. PATENT DOCUMENTS 4,234,948 A * 11/1980 Maekawa ............. G04B 39/02 368/294
4,322,834 A * 3/1982 Schaeren ............... G04B 39/02 368/296

(Continued)

FOREIGN PATENT DOCUMENTS

CH 477041 A 4/1969
JP S49-13677 U 2/1974

(Continued)

OTHER PUBLICATIONS

International Preliminary Report on Patentability and Written Opinion dated Aug. 29, 2023 received in International Application No. PCT/JP2022/000622.

(Continued)

*Primary Examiner* — Edwin A. Leon
(74) *Attorney, Agent, or Firm* — Scully, Scott, Murphy & Presser, P.C.

(57) ABSTRACT

A timepiece case including: a case; a windshield member, a first portion from among a side surface of the windshield member facing the case; a waterproofing member positioned between the case and the windshield member and configured to waterproof an inside of the case; and an exterior member, wherein: the case has a plurality of protrusions that is provided at respective plurality of portions facing the first portion and protrudes from an inner-wall surface of the case toward the first portion, the plurality of protrusions prescribes a position range for the side surface of the windshield member with respect to the case, and the exterior member (Continued)

faces a second portion that is from among the side surface of the windshield member and differs to the first portion.

16 Claims, 3 Drawing Sheets

(56) References Cited

U.S. PATENT DOCUMENTS

| | | | | |
|---|---|---|---|---|
| 10,345,760 | B2 * | 7/2019 | Kayano | G04B 39/02 |
| 2022/0397866 | A1 * | 12/2022 | Tajima | G04B 39/025 |

FOREIGN PATENT DOCUMENTS

| | | | |
|---|---|---|---|
| JP | S57148282 | A | 9/1982 |
| JP | S58200189 | A | 11/1983 |
| JP | S61174690 | U | 10/1986 |
| JP | H05119162 | A | 5/1993 |
| JP | H07311284 | A | 11/1995 |
| JP | H11-183650 | A | 7/1999 |
| JP | 2002107464 | A | 4/2002 |
| JP | 2003004869 | A | 1/2003 |
| JP | 3541077 | B2 | 7/2004 |
| JP | 2013142577 | A | 7/2013 |
| JP | 2018100927 | A | 6/2018 |

OTHER PUBLICATIONS

International Search Report dated Jan. 22, 2022 issued in PCT/JP2022/000622.

Notice of Reasons for Refusal dated Aug. 20, 2024 received in Japanese Patent Application No. 2021-029452.

Notice of Reasons for Refusal dated Sep. 24, 2025 received in Japanese Patent Application No. 2024-210103.

Chinese Office Action dated Nov. 20, 2025 received in Chinese Application No. 202280016857.5.

Japanese Decision of Refusal dated Dec. 19, 2025 received in Japanese Patent Application No. 2024-210103.

* cited by examiner

TIMEPIECE CASE AND ELECTRONIC TIMEPIECE

TECHNICAL FIELD

The present invention relates to a timepiece case and an electronic timepiece.

BACKGROUND ART

Electronic timepieces and particularly wristwatches that are worn on bodies are used in various environments, and thus there are electronic timepieces to which a waterproof property has been granted. It is known that granting a waterproof property includes the use of, inter alia, an O-ring (packing) or achieving a sealed structure by using an adhesive.

Meanwhile, there are electronic timepieces that further combine an exterior member such as a bezel to thereby improve design properties or impact resistance (Patent Document 1).

CITATION LIST

Patent Documents

Patent Document 1: Japanese Patent Application Publication No. 2003-4869

SUMMARY OF INVENTION

Technical Problem

However, when combining an exterior member while ensuring a waterproof property, conventional techniques have had a problem that the size and particularly the thickness of an electronic timepiece increases, and it is difficult to achieve compactness.

One objective of this invention is to provide a timepiece case and an electronic timepiece that enable an exterior member to be combined more compactly while ensuring a waterproof property.

Solution to Problem

In order to achieve the abovementioned objective, the present invention is a timepiece case that is provided with:

a case;

a windshield member, a first portion from among a side surface of the windshield member facing the case;

a waterproofing member that is positioned between the case and the windshield member and waterproofs an inside of the case; and an exterior member, wherein the exterior member faces a second portion that is from among the side surface of the windshield member and differs to the first portion.

Advantageous Effects of Invention

By virtue of the present invention, there is an effect of being able to more compactly combine an exterior member while ensuring a waterproof property for a timepiece case.

DESCRIPTION OF EMBODIMENTS

Embodiments of the present invention are described below on the basis of the drawings.

Figure 1:
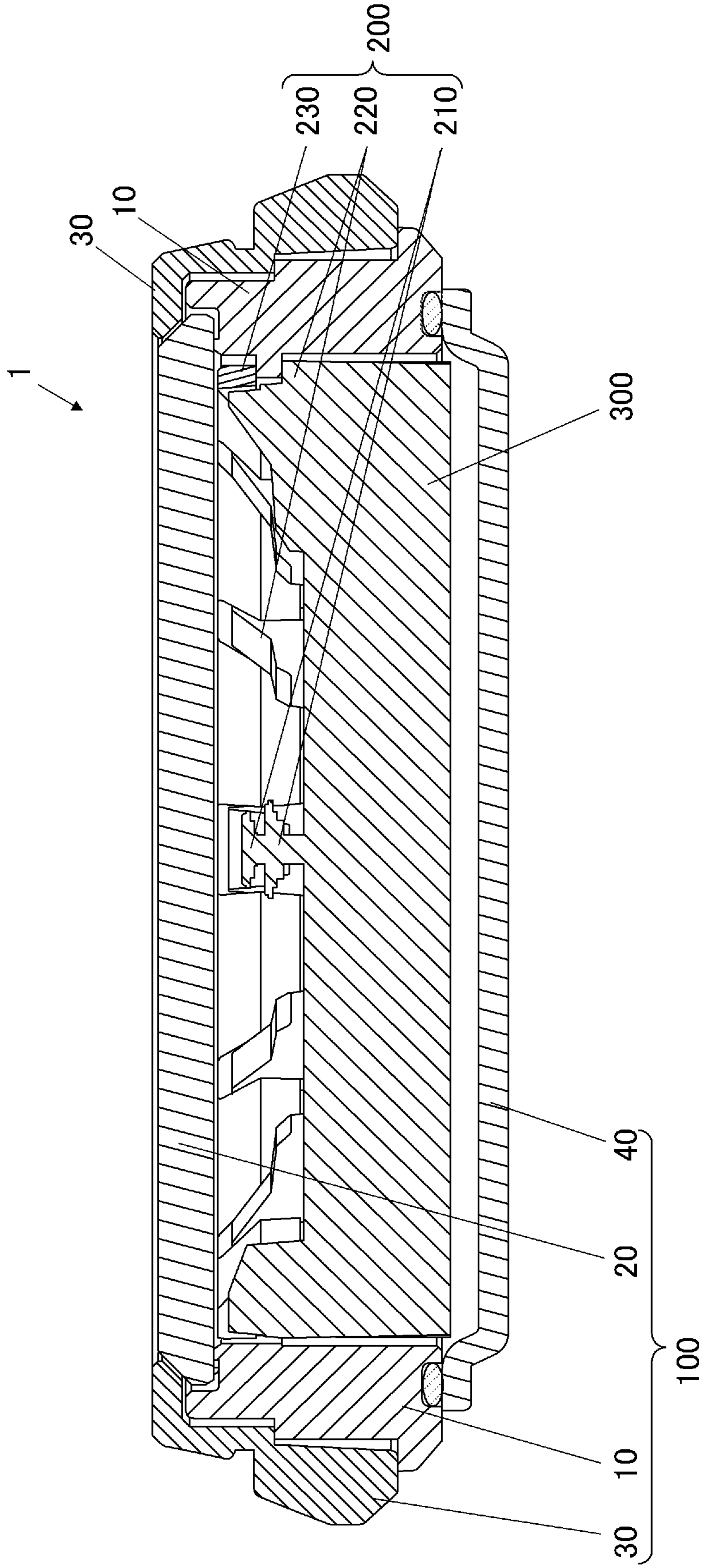
FIG. 1 This is a cross-sectional view for describing a structure of an electronic timepiece according to the present embodiment.

FIG. 1 is a cross-sectional view for describing a structure of an electronic timepiece 1 according to the present embodiment.

The electronic timepiece 1 is provided with, inter alia, a timepiece case 100, a display 200, and an operator 300.

The timepiece case 100 internally accommodates the display 200 and the operator 300. The timepiece case 100 is provided with, inter alia, a case 10, windshield glass 20, an exterior member 30, and a back cover 40.

The case 10 has a cylindrical shape of which both ends are open. One end (referred to as a top side) at which a display is performed is sealed by the windshield glass 20, and the end (referred to as a bottom side) opposite to this one end is sealed by the back cover 40. A cross-section of space inside the case 10 does not need to have a uniform shape. There is no particular limitation, but, for example, it may be that the top-side open end and the windshield glass 20 are circular in a plan view, and the bottom-side open end and the back cover 40 have, inter alia, a shape resulting from cutting off corners of a rectangle in a plan view seen from above. Regarding a height direction, a vertical cross-section may continuously or discontinuously change partway through. The case 10 is a resin, for example.

The windshield glass 20 is a transparent member such as glass (various inorganic glass; in addition to something having silicon dioxide as a main component, may be, inter alia, sapphire glass, for example) and, as described below, is a windshield member that is secured to the case 10 by an adhesive and covers above the inside of the case 10 is a manner that enables visual recognition of the inside of the case 10. The windshield member, which is transparent, is not limited to glass, and may be, inter alia, a resin, for example. The windshield member does not need to have only a single material, and may be, inter alia, something that has, inter alia, a coating layer (coating film) made from one material on a surface of another material. These may be selected in accordance with various conditions such as strength of adhering to an adhesive as well as, inter alia, hardness, strength, durability, and difficulty of scratching the surface thereof. For example, the back cover 40 is an electrically-conductive member such as a metal or an electrically-insulating member such as a resin, and is secured to the case 10 by, inter alia, a screw (machine screw).

The exterior member 30 is, inter alia, a bezel, and alleviates impact on the body of the electronic timepiece 1 or is used as a decorative member for the purpose of design. The exterior member 30 is annular but does not need to have a uniform structure. In the following description, a top-surface position of the exterior member 30 may be a position at a point that is positioned most upward in the exterior member 30. The exterior member 30 is connected to, inter alia, side surfaces of the case 10. For example, the connection may be securing in accordance with, inter alia, a screw (machine screw) or may be in accordance with, inter alia, fitting. The exterior member 30 may be a resin member or may be, inter alia, a metal member.

The display 200 performs a display that includes at least a time display (is capable of a display pertaining to time). The display 200 is not particularly limited, but may have, inter alia, a plurality of hands 210 and labels 220, for example. The labels 220 include hour signs or graduations for indicating the time and, inter alia, the time is represented by directions in which the hands 210, which operate by revolving, point to labels 220. A perimeter of a range of display by the display 200 is separated by a parting plate 230 that is positioned along an inner edge of the case 10. In addition to or in place of this, the display 200 may have a display screen for performing a digital display, for example, a liquid-crystal display screen. The display 200 is positioned such that display content can be visually recognized from an outer-surface side (top side), via the windshield glass 20.

The operator 300 is positioned inside the case 10 and has, inter alia, a controller that controls operation of the display 200, a driver that causes the display 200 to operate in response to a control signal from the controller, and a power supply for supplying power to each component in the operator 300. The control unit includes, inter alia, a CPU and a RAM. A timekeeping operation for counting time may be performed by the controller, or there may be a timekeeping circuit that is separate from the controller. The driver includes, inter alia, a motor and a gear train that is rotationally operated by the motor, and the hands are rotationally operated in response to rotation by the gear train. The power supply supplies power at a predefined voltage to the controller and the driver. The operator 300 may include a battery as a power source pertaining to power supplied by the power supply. The battery may be a secondary battery, for example. Alternatively, it may be that the battery can be removed and replaced.

Figure 2:
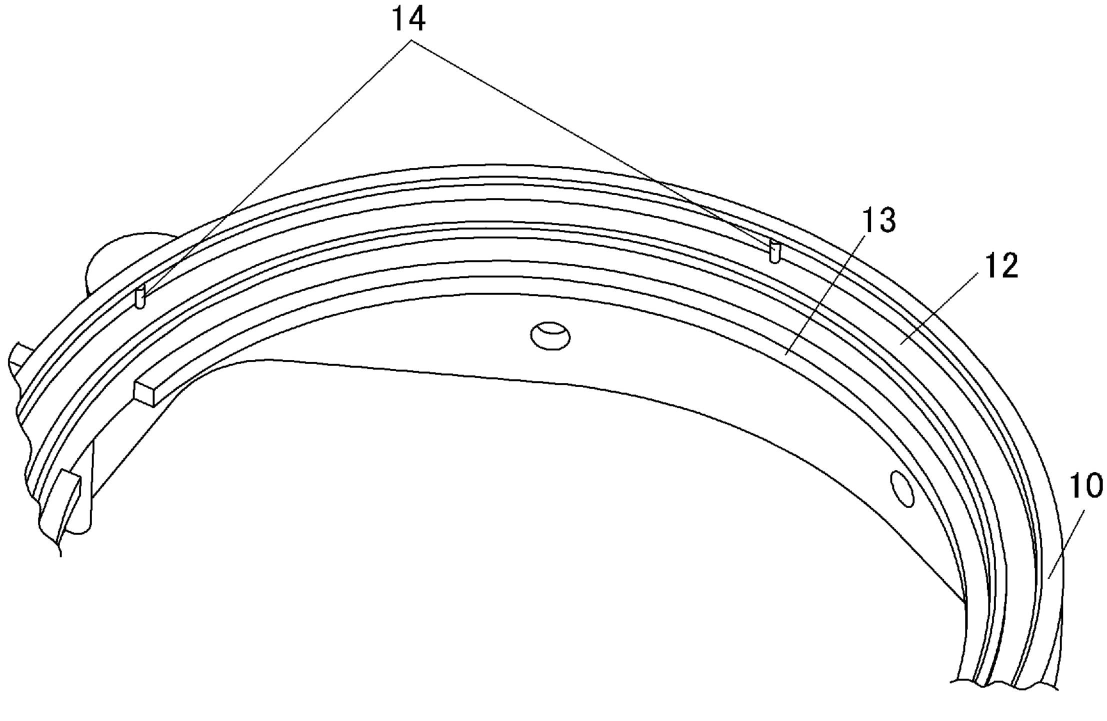
FIG. 2 This is a perspective view in which a portion of a case is viewed.

FIG. 2 is a perspective view in which a portion of the case 10 is viewed.

The case 10 has, on an inner-wall surface 11, supports 12, 13 that protrude in two stages and protrusions 14 at portions facing a first portion 21 which is more upward than the support 12. The support 12 supports the windshield glass 20, and the support 13 is positioned lower than the support 12 to thereby support the parting plate 230.

The supports 12, 13 annularly protrude along the circumferential direction of the inner-wall surface 11. The support 13 has a discontinuity in the protrusion thereof, but there is no limitation to this. The protrusions 14, for example, linearly extend in an up-down direction for the inner-wall surface 11. The protrusions 14 are, for example, positioned at appropriate intervals at at least three locations.

A range of a circle prescribed by the positions of tips of the protrusions 14 is the same as or slightly larger than a plan view range in which the windshield glass 20 is seen from above. By the windshield glass 20 being inserted into this circle range, a position range for the windshield glass 20 is prescribed and position deviation is reduced, but a gap arises between the windshield glass 20 and the inner-wall surface 11 where the protrusions 14 are not present.

Figure 3A:
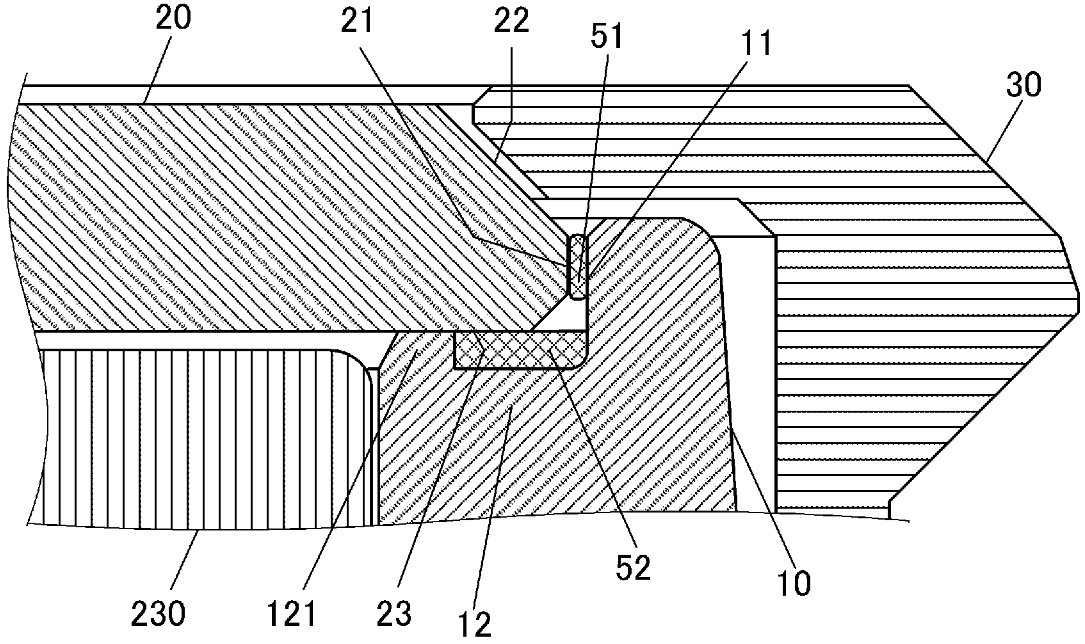
FIG. 3A This is a view that illustrates a portion of a cross-section in a plane that includes a central axis of the case.
Figure 3B:
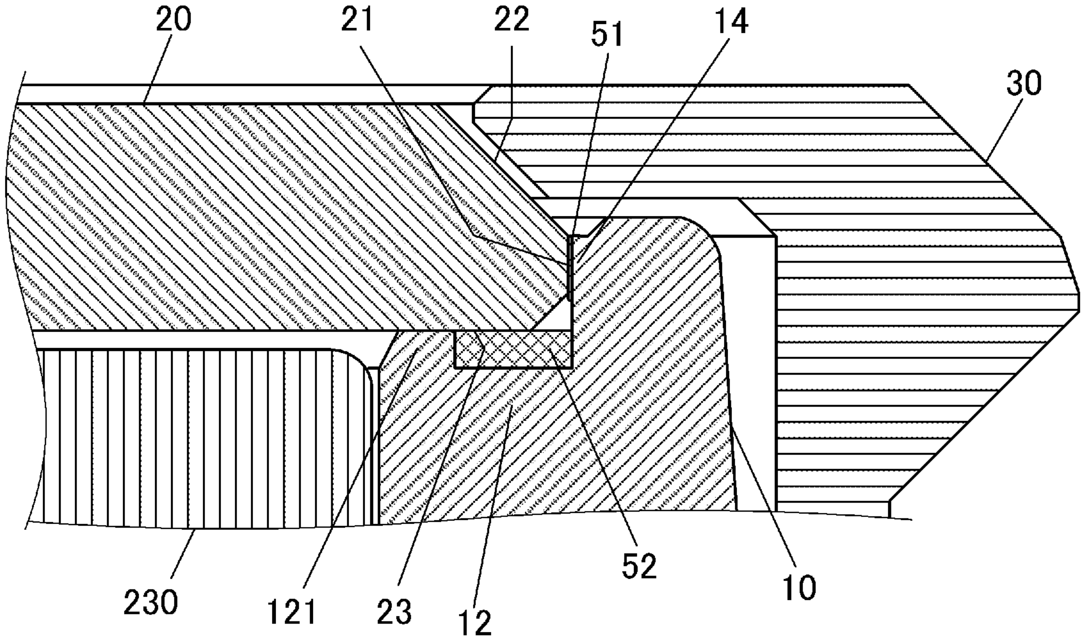
FIG. 3B This is a view that illustrates a portion of a cross-section in a plane that includes the central axis of the case.

FIG. 3A is a view that illustrates a portion of a cross-section along a cross-sectional line that does not include the protrusions 14, in a plane that includes a central axis of the case 10. FIG. 3B is a view that illustrates a portion of a cross-section along a cross-sectional line that includes a protrusion 14, in a plane that includes the central axis of the case 10.

As illustrated in FIG. 3A, the windshield glass 20 is supported by a third portion 23 thereof, which follows an outer edge of an inner surface (display 200 side), being positioned on the support 12, and fits inside the inner-wall surface 11. The thickness of the windshield glass 20 is greater than the height of the inner-wall surface 11 above the support 12 and, in other words, the windshield glass 20 protrudes upward with respect to the case 10. A side-surface portion that belongs to the windshield glass 20 and faces the inner-wall surface 11 of the case 10 is a first portion 21.

Here, the first portion 21 is bonded to the inner-wall surface 11 using an adhesive 51 (first adhesive) positioned between the first portion 21 and the case 10, and a third portion 23 is bonded to the support 12 (case 10) using an adhesive 52 (second adhesive) positioned between the third portion 23 and the case 10. The adhesive 51 and the adhesive 52 function as waterproofing members and, as a result, a waterproof property can be achieved by the top side of the case 10 being sealed to thereby waterproof (prevent the ingress of water) the inside of the case 10. Note that a range for the adhesive 51 and a range for the adhesive 52 are separately illustrated in FIG. 3A and FIG. 3B, but may be connected.

There is a gap in which a layer for the adhesive 51 can be achieved, between the first portion 21 and the inner-wall surface 11. The adhesive 51, in a bonded state, is a member that has a high elasticity—in other words has an elastic modulus that is not very high—and appropriately extends or contracts, whereby even in a case where there is a large impact due to, inter alia, the electronic timepiece 1 being dropped, it is possible to decrease the chance of the adhesive 51 peeling from the case 10 or the windshield glass 20 and the case 10 suffering damage.

Meanwhile, the support 12 has a protrusion 121 that faces upward annularly along the inner edge thereof. Due to this protrusion 121, the adhesive 52 leaking from above the top surface of the support 12 before curing is prevented. The adhesive 52 may be of the same kind as the adhesive 51. Alternatively, the adhesive 52 may have a higher (harder) elastic modulus when bonding is achieved than that of the adhesive 51. As a result, relative movement of the bonded windshield glass 20 with respect to the support 12 is constrained, and the windshield glass 20 is stably secured.

The adhesive 51 and the adhesive 52 are not particularly limited, but may be thermosetting adhesives. Heat necessary for curing in this case is set to a range that does not impact, inter alia, the windshield glass 20 and the case 10. There is no need for heat to be directly irradiated onto an adhesive, and therefore it is easy for a curing process to be performed.

The height of the first portion 21 is approximately equal to the width of the third portion 23. Because an outer edge of the third portion 23 and a lower end of the first portion 21 are both side surface lower ends of the windshield glass 20, namely the area (bonding area) of the first portion 21 is approximately equal to the area (bonding area) of the third portion 23. As a result, a waterproof property and robustness are stably maintained. The "approximately equal" used here is not strict. There may be deviation of approximately 10-20%. Alternatively, the height of the first portion 21 may be less than the width of the third portion 23.

Regarding the windshield glass 20, a side surface (outer edge) of a portion (a portion different to the first portion 21) thereof that protrudes upward with respect to the case 10 as described above is chamfered and has a surface that is inclined with respect to the up-down direction (the first portion 21), for example 45-degree inclined surface (chamfering). This inclined surface (chamfered surface) is a second portion 22. This second portion 22 faces the exterior member 30.

The outer surface (top surface) of the windshield glass 20 and the top surface of the exterior member 30 are approximately within the same plane. At least, the outer surface position of the windshield glass 20 does not protrude upward from the top-surface position of the exterior member 30. The "approximately within the same plane" used here includes a case of being completely positioned within the same plane as well as a case in which the outer surface of the windshield glass 20 is positioned slightly below the top-surface position of the exterior member 30, in a range (such as 0.1 mm) smaller than a SUS thickness (approximately 0.6-0.75 mm), for example. By the outer surface of the windshield glass 20 being slightly lower than the top-surface position of the exterior member 30, the windshield glass 20 is less likely to come into direct contact with the surface of another object while protrusion by the exterior member 30 is reduced.

At a minimum, it is sufficient if the first portion 21 has a height that is necessary to define the position of the side surface of the windshield glass 20 with respect to the case 10 and to be reliably bonded to the case 10, and the height of the first portion 21 may be less than the height of the second portion 22. Because it is possible to increase the height of the second portion 22 the shorter the first portion 21, it becomes possible to widen design variation without allowing the top surface of the exterior member 30 to protrude from the outer surface of the windshield glass 20. In a case of ensuring a waterproof property using the adhesive 51 between facing surfaces belonging to the first portion 21 and the case 10, in addition to the above, the first portion 21 may be set to a height necessary in order to achieve the waterproof property.

The second portion 22 of the windshield glass 20 and the surface of the exterior member 30 that faces the windshield glass 20 are inclined with respect to the first portion 21, whereby it ceases to be easy to visually recognize, from outside, the adhesive 51 positioned between the windshield glass 20 and the case 10. It may be that facing portions of this second portion 22 and the exterior member 30 have a minute gap therebetween (the entirety of the second portion 22 is not in contact with the exterior member 30) but are in contact with each other without being bonded. In addition, it may be opaque printing as a blind is performed on the third portion 23 of the windshield glass 20 such that the adhesive 52 bonded to the third portion 23 is not easily visually recognized through the windshield glass 20.

As described above, the case 10 has the protrusions 14 on the inner-wall surface 11. As illustrated in FIG. 3B, the height (inward size from the inner-wall surface 11) of each protrusion 11 is uniform over the up-down direction, but is not limited to this. With respect to the position of the windshield glass 20 prescribed by the protrusions 14, the gap between the inner-wall surface 11 and the first portion 21 of the windshield glass 20 is substantially uniform. This gap is a space that is filled by the adhesive 51, and the adhesive 51 bulging out from this gap is suppressed.

The electronic timepiece 1 having the timepiece case 100 described above is manufactured by the following steps. Firstly, the position of the parting plate 230 is aligned and disposed with respect to the timepiece case 100. Next, with respect to at least one of the timepiece case 100 and the windshield glass 20, the adhesives 51, 52 are applied and bonded to the adhesion surfaces thereof, and cured. Subsequently, an exterior component such as the exterior member 30 is assembled, and then the operator 300 is accommodated within the timepiece case 100 from the back side of the timepiece case 100. Finally, the back cover 40 is closed by, inter alia, a screw, and the electronic timepiece 1 is achieved.

As above, the timepiece case 100 according to the present embodiment is provided with the case 10, the windshield glass 20 of which a first portion 21 from among side surfaces thereof faces the case 10, the adhesive 51 that is positioned between the case 10 and the windshield glass 20 to thereby waterproof inside the case 10 as a waterproofing member, and the exterior member 30. The exterior member 30 faces a second portion 22 that is a side surface of the windshield glass 20 and differs to the first portion 21.

In this manner, the position of the exterior member 30 is adjusted such that, in addition to the case 10, the exterior member 30 also partially faces a side surface of the windshield glass 20, whereby it is possible to reduce the height of the timepiece case 100 due to the exterior member 30 having been positioned above (outside) the windshield glass 20, and achieve a more compact configuration.

In addition, the adhesive 51 is positioned between the first portion 21 and the case 10. As a result, it is possible to prevent water from entering within a gap between the windshield glass 20 and the case 10.

In addition, the entirety of the second portion 22 of the windshield glass 20 is not in contact with the exterior member 30. In other words, there is a gap between the second portion 22 and the exterior member 30, whereby buffering corresponding to the gap arises when there is an impact such as a fall or a collision, and it is possible to reduce the chance of damaging the windshield glass 20 or the case 10 and suppress the adhesives 51, 52 peeling away from the windshield glass 20.

Waterproofing members are the adhesives 51, 52. Conventionally, in order to achieve a waterproof property, for example, a glass member is pressurized and pushed in (inserted) after disposing a member such as a waterproof gasket for glass at a location for positioning the glass member in contact with a resin case 10. To perform such insertion work, the case 10 needed to have an insert fitting, but by employing a waterproof structure using the adhesive 51, there ceases to be a need to use a case 10 that has an insert fitting. In addition, to achieve by a waterproof gasket a sufficient waterproof property, for example a waterproof property of 10 atmospheres or more, it ceases to be possible to ignore the thickness thereof in comparison to the size of, inter alia, a wristwatch. Therefore, using the adhesives 51, 52, it is possible to establish both of ensuring a waterproof property and suppressing an increase in size.

In addition, the case 10 has the protrusions 14 at portions facing the first portion 21. As a result, it is possible to easily and accurately position the windshield glass 20 with respect to the case 10, and thus it is possible to achieve a finished appearance that does not rattle by simply placing the windshield glass 20 onto the case 10. In addition, in a case where the waterproofing member is the adhesive 51, a portion other than the protrusions 14 is a gap occupied by the adhesive 51, and thus at a time of pressurized bonding it is possible to reduce the chance of the adhesive 51 bulging out from bonding surfaces and impacting the periphery or impairing aesthetics.

In addition, the protrusions 14 prescribe a position range for the side surface of the windshield glass 20 with respect to the case 10. As a result, it is possible to easily secure the windshield glass 20 with respect to the case 10 at an appropriate position while providing the abovementioned gap, and it is possible to reduce variation between products and reduce time and effort to assemble and manufacture the electronic timepiece 1 (the timepiece case 100).

In addition, the case 10 has the protrusions 14 positioned at portions that face the first portion 21, and the support 12 that supports the third portion 23 following an outer edge on the inner surface of the windshield glass 20. Because the windshield glass 20 is supported on the inner surface side in addition to the side surface, the position of the windshield glass 20 is defined in a more reliable and easier manner. In addition, it is possible to stably support the windshield glass 20 with respect to pressure from an outer surface side.

In addition, the adhesive 52, which is a waterproofing member, may be positioned between the third portion 23 and the case 10. Even in this case, it is possible to achieve a sufficient waterproof property without greatly increasing the thickness of the timepiece case 100. In this case, it is sufficient if the width of the third portion 23 is a minimum width at which work for applying an adhesive is possible.

In addition, the height of the first portion 21 may be less than or equal to the width of the third portion 23. In a case where a waterproof property is achieved by the adhesive 52 which is bonded to the third portion 23, it is sufficient if the first portion 21, at a minimum, has a height necessary to prescribe the side surface position of the windshield glass 20. In addition, even in a case where waterproofing is not performed at the third portion 23, the first portion 21 may be made to be lower in a range at which a waterproof property is achieved. Accordingly, the first portion 21 is made to be smaller than the third portion 23, whereby it becomes possible to position a greater portion of the exterior member 30 on the side surface of windshield glass 20. As a result, it is possible to reduce the thickness of the timepiece case 100 while maintaining a waterproof property.

In addition, the second portion 22 of the windshield glass 20 is inclined with respect to the first portion 21. As a result, the surface of the exterior member 30 that faces the second portion 22 is also inclined, the gap between the first portion 21 and the case 10 is not directly viewed from the gap between the second portion 22 and the case 10, and aesthetics are not impaired by the adhesive 51.

In addition, the second portion 22 is a chamfered surface of the windshield glass 20. As a result, the top surface of the exterior member 30 is positioned covering the side portions of the windshield glass 20, and thus it is possible to increase the impact resistance of the windshield glass 20 to thereby protect this while the timepiece case 100 can be made to be thinner. In addition, it becomes possible to easily be able to visually recognize the entirety of the top surface of the windshield glass 20 which is bordered by the chamfered surface, and thus it is possible to ensure a wide face region for the electronic timepiece 1 and thereby make the display easier to see. Meanwhile, it is possible to achieve a wider top surface for the exterior member 30, and it is possible to diversify design patterns.

In addition, the height of the first portion 21 may be less than the height of the second portion 22. By reducing the height of the first portion 21, it becomes easier to widen a range of designs for the exterior member 30.

In addition, the outer surface of the windshield glass 20 is positioned within the same plane as the top surface of the exterior member 30. As a result, it is possible to suppress the height of the exterior member 30 to be in a range that enables the outer surface of the windshield glass 20 to be protected, and reduce the thickness of the timepiece case 100.

In addition, the electronic timepiece 1 according to the present embodiment is provided with the timepiece case 100 described above, the display 200 that is positioned in a manner enabling visual recognition through the windshield glass 20 and that enables a display pertaining to time, and the controller that is positioned inside the case 10 and controls operation by the display 200.

Such an electronic timepiece 1 enables the thickness of the electronic timepiece 1 to be reduced while ensuring a waterproof property.

Note that the present invention is not limited to the embodiment described above, and various modifications are possible.

For example, in the embodiment described above, the first portion 21 and the case 10 are described as being bonded by the adhesive 51 and the second portion 22 and the case 10 are described as being bonded by the adhesive 52, but it may be that one of the adhesives 51, 52 is not present. In addition, in place of the adhesive 51, it may be that a waterproof gasket as a waterproofing member is positioned, inter alia, between the first portion 21 and the case 10.

In addition, in the embodiment described above, description was given by taking as an example the protrusions 14 that linearly extend up and down, but there is not limitation to this. The protrusions 14 do not need to be linear. In addition, the widths of the protrusions 14 do not need to be uniform. It was indicated that the protrusions 14 are positioned at three or more locations to thereby prescribe the side surface position of the windshield glass 20, but the protrusions 14 may prescribe a range that is wider than the outer periphery of the windshield glass 20. In addition, the protrusions 14 are only for achieving a gap between the windshield glass 20 and the case 10, for example, and do not need to be positioned at three or more locations. Alternatively, the case 10 does not need to have the protrusions 14 at all.

In addition, the case 10 does not need to have the support 12. It is sufficient if the case 10 and the windshield glass 20 can be secured in an appropriate positional relationship. In addition, even when the support 12 is present, the support 12 does not need to be annular, and may have, inter alia, a shape that has a discontinuous portion, for example. In this case, the adhesive 52 may be present, but because waterproofing is not achieved, a waterproof property is ensured between the first portion 21 and the case 10.

In addition, the second portion 22 does not need to be a plane having an angle of inclination of 45 degrees. The second portion 22 may have another angle of inclination or may be a curved surface. Alternatively, the second portion 22 may have a portion that is kinked partway—in this case the side surface of the windshield glass 20 does not need to have an inclined portion. In accordance with the shape of the second portion 22, the facing surface of the exterior member 30 also has the same shape.

In addition, the outer surface side of the windshield glass 20 is made to be chamfered to achieve the second portion 22, but there is no limitation to this. It may be that the diameter of the windshield glass 20 is smaller at the first portion 21 than the second portion 22, and the second portion 22 is inclined such that the side surface extends outward from the center. In this case, treatment for preventing easy visual recognition through the windshield glass 20 (such as the abovementioned opaque printing) may be performed on, inter alia, the first portion 21 and the second portion 22, for example.

In addition, in the embodiment described above, the outer surface of the windshield glass 20 is described as not protruding above the top surface of the exterior member 30, but the outer surface of the windshield glass 20 may be positioned above the top surface of the exterior member 30. In addition, the top surface of the exterior member 30 may be clearly protruding from the outer surface of the windshield glass 20.

In addition, in the embodiment described above, the height of the first portion 21 is described as less than or equal to the width of the third portion 23, but the height of the first portion 21 may be greater than the width of the third portion 23. In, inter alia, a case in which the third portion 23 is very narrow, the height of the first portion 21 does not need to also be made to be small in conjunction with this. In addition, the height of the first portion 21 and the width of the third portion 23 may be defined independently, in ranges where a waterproof property is achieved, as described above.

In addition, in the embodiment described above, the side surface of the windshield glass 20 is described as being divided into two—the first portion 21 and the second portion 22—but there is no limitation to this. A region that is neither of these may be included, and this region that is neither of these may be positioned between the first portion 21 and the second portion 22.

In addition, the electronic timepiece 1 according to the embodiment described above is not limited to being dedicated to timepiece functionality. The electronic timepiece 1 may be a multifunction timepiece that has various functions or may be, inter alia, a various wrist-worn terminal apparatus (smart watch) on which a time display is typically performed.

In addition, specific configurations, positional relationships, shapes, structures, materials, etc. described in the embodiment above can be modified, as appropriate, in a scope that does not deviate from the spirit of the present invention.

While some embodiments of the present invention are described, the scope of the present invention is not limited to the embodiments described above, and includes the scope of the invention set forth in the claims and the scope of their equivalents.

INDUSTRIAL APPLICABILITY

This invention is applicable to a timepiece case and an electronic timepiece.

The invention claimed is:

1. A timepiece case comprising:

a case;

a windshield member, a first portion from among a side surface of the windshield member facing the case;

a waterproofing member positioned between the case and the windshield member and configured to waterproof an inside of the case; and an exterior member, wherein:

the case has a plurality of protrusions that is provided at respective plurality of portions facing the first portion and protrudes from an inner-wall surface of the case toward the first portion, the plurality of protrusions prescribes a position range for the side surface of the windshield member with respect to the case, and the exterior member faces a second portion that is from among the side surface of the windshield member and differs to the first portion.

2. The timepiece case according to claim 1, wherein the waterproofing member is positioned between the first portion and the case.

3. The timepiece case according to claim 1, wherein an entirety of the second portion belonging to the windshield member is not in contact with the exterior member.

4. The timepiece case according to claim 1, wherein the waterproofing member is an adhesive.

5. The timepiece case according to claim 1, wherein the case has a protrusion that is positioned at a portion facing the first portion, and a support that supports a third portion from among an inner surface the windshield member, the third portion following an outer edge of the inner surface of the windshield member.

6. The timepiece case according to claim 5, wherein the waterproofing member is positioned between the third portion and the case.

7. The timepiece case according to claim 5, wherein a height of the first portion is less than or equal to a width of the third portion.

8. The timepiece case according to claim 1, wherein the second portion belonging to the windshield member is inclined with respect to the first portion.

9. The timepiece case according to claim 8, wherein the second portion is a chamfered surface belonging to the windshield member.

10. The timepiece case according to claim 1, wherein a height of the first portion is smaller than a height of the second portion.

11. The timepiece case according to claim 1, wherein an outer surface of the windshield member is positioned within the same plane as a top surface of the exterior member.

12. An electronic timepiece, comprising:

the timepiece case according to claim 1;

a display that is positioned in a manner enabling visual recognition through the windshield member, and is capable of a display pertaining to time; and a controller that is positioned inside the case and controls operation of the display.

13. The timepiece case according to claim 1, wherein the plurality of protrusions linearly extends in an up-down direction for the inner-wall surface.

14. The timepiece case according to claim 4, wherein the inner-wall surface of the case has the plurality of portions at which the respective plurality of protrusions is provided and a portion at which the plurality of protrusions is not provided, and the adhesive is placed in a gap formed between the first portion and the portion at which the plurality of protrusions is not provided.

15. The timepiece case according to claim 1, wherein a tip of each of the plurality of protrusions is positioned, in a plan view, at a same position as an outermost contour of the windshield member or at a position closer to the inner-wall surface than the outermost contour.

16. The timepiece case according to claim 5, wherein the support has a protrusion that protrudes upward annularly along an inner edge of the case.

* * * * *